(12) United States Patent
Messel

(10) Patent No.: US 6,550,927 B1
(45) Date of Patent: Apr. 22, 2003

(54) LIGHT GUIDE FOR A COMMUNICATION UNIT

(75) Inventor: Atle Messel, Copenhagen (DK)

(73) Assignee: Nokia Mobile Phones Limited, Espoo (FI)

(*) Notice: Subject to any disclaimer, the term of this patent is extended or adjusted under 35 U.S.C. 154(b) by 0 days.

(21) Appl. No.: 09/688,128

(22) Filed: Oct. 16, 2000

(30) Foreign Application Priority Data

Oct. 19, 1999 (GB) .............................................. 9924736

(51) Int. Cl.⁷ .................................................. F21V 8/00
(52) U.S. Cl. .......................................... 362/24; 362/31
(58) Field of Search ..................... 362/31, 24

(56) References Cited

U.S. PATENT DOCUMENTS

| | | | | |
|---|---|---|---|---|
| 3,774,021 A | | 11/1973 | Johnson ........................ | 240/2.1 |
| 4,349,705 A | * | 9/1982 | Kuhfus ......................... | 362/24 |
| 4,929,062 A | * | 5/1990 | Guzik et al. .................. | 362/31 |
| 5,053,928 A | * | 10/1991 | Pasco ........................... | 362/31 |
| 5,128,842 A | | 7/1992 | Kenmochi .................... | 362/95 |
| 5,130,897 A | * | 7/1992 | Kuzma .......................... | 362/24 |
| 5,655,826 A | * | 8/1997 | Kouno et al. ................. | 362/24 |
| 5,708,428 A | | 1/1998 | Phillips ........................ | 341/22 |
| 5,711,588 A | | 1/1998 | Rudisill ....................... | 362/31 |
| 5,746,493 A | | 5/1998 | Jonsson ........................ | 362/31 |
| 5,847,336 A | | 12/1998 | Thornton ...................... | 200/5 |

FOREIGN PATENT DOCUMENTS

| | | |
|---|---|---|
| EP | 0414366 | 2/1991 |
| GB | 2285518 | 10/1995 |
| JP | 661913 | 4/1994 |
| WO | 9733268 | 9/1997 |
| WO | 9826438 | 6/1998 |

* cited by examiner

*Primary Examiner*—Laura K. Tso
(74) *Attorney, Agent, or Firm*—Antonelli, Terry, Stout & Kraus, LLP (57) ABSTRACT

A communication unit including a light guide for illuminating a display including a substantially transparent plate-formed element with reception means for receiving light from light sources and for guiding the light into the transparent plate-formed element of the light guide. The reception means includes light in-coupling surfaces each facing towards a light source and being substantially parallel with a main surface of the light guide. The reception means includes a lens and a diffuser, for dispersing the light substantially parallel with the main surface of the light guide to illuminate the display. The light guide also has means for illuminating a keyboard. The means to illuminate the keyboard includes keyholes through the light guide, the keyholes having chamfered surfaces for reflecting the light in the light guide perpendicular to the surface of the light guide onto the keyboard. The light guide also incorporates a dome sheet having a reflector sheet attached to one side of the light guide and a keyboard flexibly attached to another side of the light guide.

19 Claims, 10 Drawing Sheets

LIGHT GUIDE FOR A COMMUNICATION UNIT

BACKGROUND OF THE INVENTION

The invention relates to communication units having a light guide for guiding light from a light source to illuminate a display. Light guides are also used to transfer light from a light source to illuminating the keyboard/keys. In mobile phones the light guide is placed between a printed circuit board and the display and/or the keyboard to transfer the light from a light source, e.g. a light emitting diode (LED), to illuminate the display or/and the keyboard.

This is e.g. shown in U.S. Pat. No. 5,746,493, where a light guide is described having a plurality of light coupling recesses. Some of the light coupling recesses are placed between keyholes on the light guide, where the LEDs mounted on a printed circuit board sticks up, and transfer through the light guide light for illuminating mainly the keyboard and partly the display. On one side of the light guide are the light coupling recesses arcuately shaped to transmit light from the LED uniformly into the light guide.

Another approach of illuminating a keyboard is shown is U.S. Pat. No. 5,711,588, where the light is reflected on a cover, mounted over the keys of a keyboard assembly, into the keys. In this case a light guide is not needed, nor is there a need for a light source for each key on the keyboard. Yet another approach is shown in U.S. Pat. No. 5,847,336, with one LED for each key to illuminate the keys directly. The LEDs are mounted on a flexible film, which is placed directly under the keyboard. Between this flexible film and the printed circuit board there is a dome sheet with domes that short-circuit a pair of electrical contacts on the printed circuit board, when pressing the keys. This approach is not used to illuminate the display, just the keyboard.

Still another approach is described in U.S. Pat. No. 5,708,428, where LEDs are embedded, by insert moulding, directly into the light guide. The light guide is placed between the keyboard and printed circuit board, having aperture for permitting the conductor on the bottom of each of the keys to contact respectively positioned contacts on the printed circuit board.

Furthermore, JP 9287981 describes a device for guiding the light from a substantially linear light-emitting element into a photo-conducting plate, without increasing the thickness of the plate. To manage to transmit the light without having a thicker plate a lens is used more exactly a Fresnel lens.

SUMMARY OF THE INVENTION

The invention provides a light guide for illuminating a display or a keyboard. The light guide is a substantially transparent plate-formed element with reception means for receiving light from light sources and for guiding the light into the transparent plate-formed element of the light guide. The reception means includes light in-coupling surfaces facing towards the light sources. The reception means is disposed in a plane that is in a substantially parallel relationship with the main surface of the light guide. The reception means includes a lens and a diffuser, for dispersing the light substantially parallel with the main surface of the light guide. The advantage provided by the light guide and associated lens and diffuser is that it allows for dispersing light in a light guide from LED's in a printed circuit board (PCB) that is coupled to the light guide. The light can therefore be transferred efficiently without making the light guide too thick or too large.

The invention also provides a light guide for illuminating a display or a keyboard incorporated in a communication unit. This enables the communication unit to have an efficient transferring of light from a light source to a display or a keyboard without becoming too thick.

In another approach of the invention there is provided a plastic dome sheet placed on one side of the light guide. On the side, which is closest to the printed circuit board. The dome sheet includes a reflector sheet, which covers a part of the light guide that could be the back screen of the display.

BRIEF DESCRIPTION OF THE DRAWINGS

The invention will be explained more fully below, by way of example, in connection with preferred embodiments and with reference to drawing, in which.

DETAILED DESCRIPTION OF THE INVENTION

Figures 1, 2:
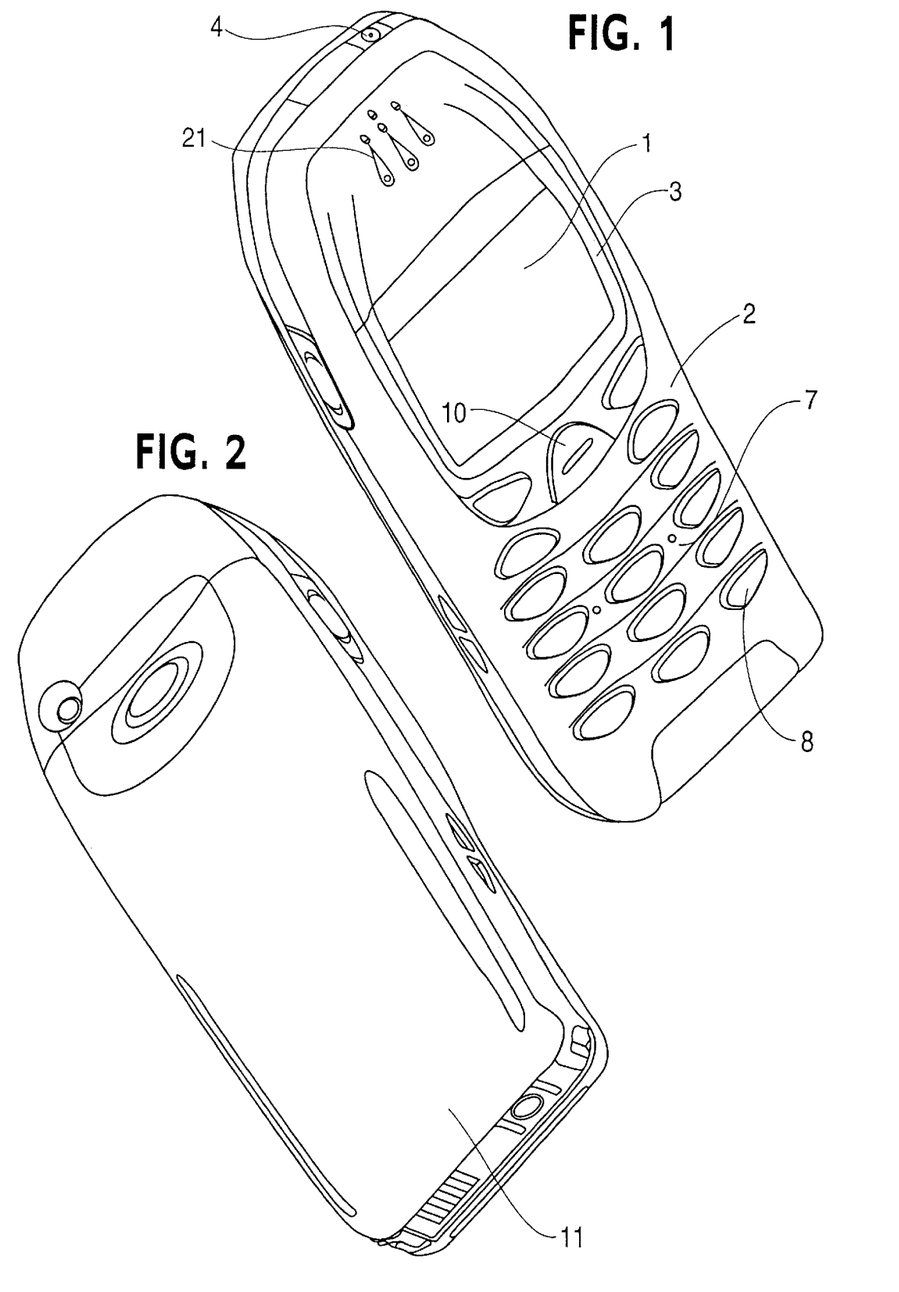
FIGS. 1–2 shows in a perspective view a preferred embodiment of the communication unit according to the invention.

According to a first aspect the communication unit according to the invention will be described with reference to a hand portable phone, preferably a cellular phone. A preferred embodiment of this phone is shown in FIG. 1 and 2. The phone is shown in perspective with the front in FIG. 1 and with the back FIG. 2. As will be seen, the phone is provided with a front cover 2 having a window frame 3 encircling the protection window of the liquid crystal display LCD assembly 1. The phone comprises a user interface having an on/off button 4, a keyboard/keypad 7, a battery 11, a display/LCD 1, an earpiece 21 and a microphone 22 FIG. 3 (not shown in FIG. 1 or 2).

Figure 3:
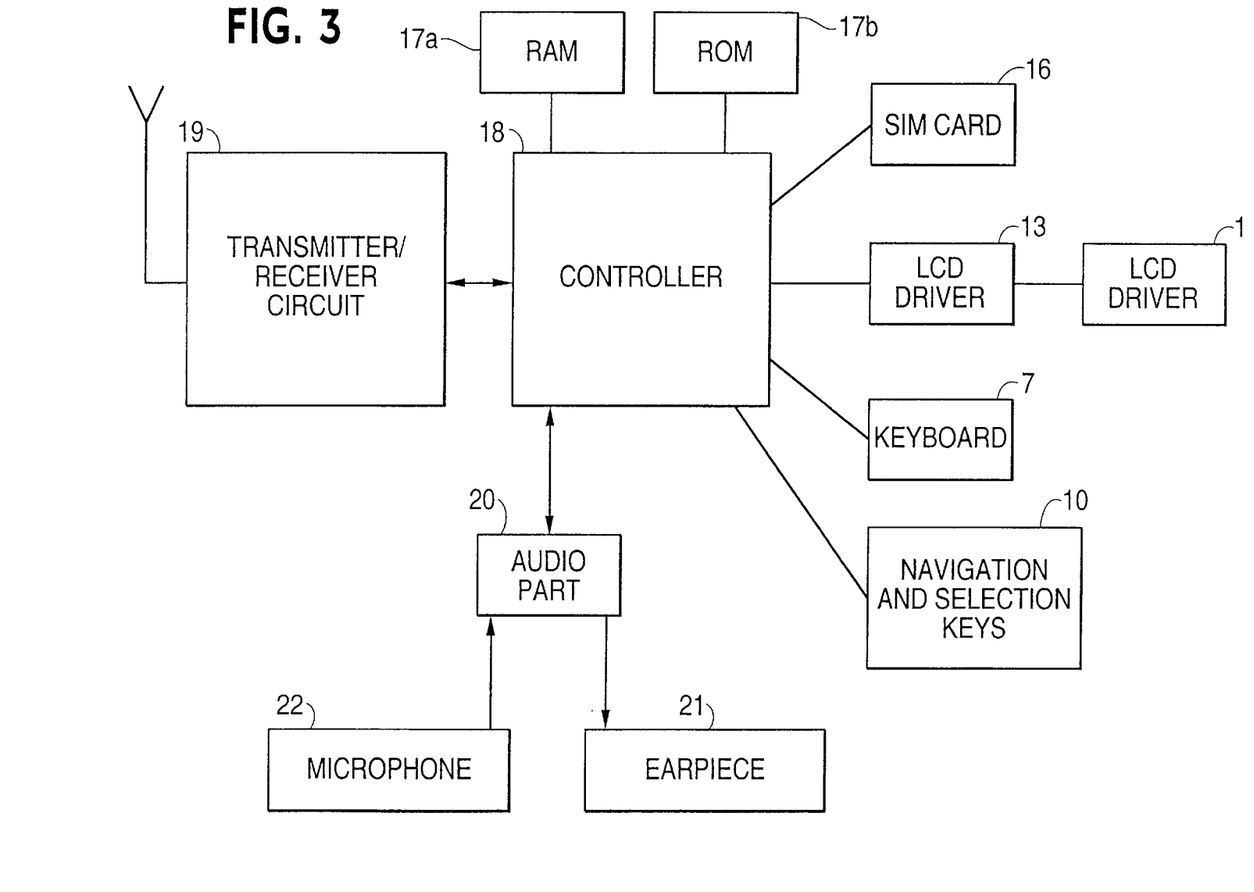
FIG. 3 schematically shows the essential parts of a telephone for communication with a cellular network.

FIG. 3 schematically shows the most important parts of a preferred embodiment of the phone, said parts being essential to the understanding of the invention. The microphone 22 records the user's speech, and the analogue signals formed thereby are ND converted in an ND converter (not shown) before the speech is encoded in an audio part 20. The encoded speech signal is transferred to the controller 18 (physical layer processor), which e.g. supports the GSM terminal software. The controller 18 also forms the user interface to the peripheral units of the apparatus, including RAM and ROM memories 17a and 17b, a SIM card 16, the LCD display I and the keyboard 7 (as well as data, power supply, etc.). The controller 18 communicates with the transmitter/receiver circuit 19. The audiopart 20 speech-decodes the signal, which is transferred from the controller 18 to the earpiece 21 via a D/A converter (not shown).

The preferred embodiment of the phone of the invention is adapted for use in connection with the GSM network, but, of course, the invention may also be applied in connection with other phone networks. It could be cellular networks, various forms of cordless phone systems or in dual band phones accessing sets of these systems/networks.

The controller 18 is connected to the user interface. Thus, it is the controller 18, which monitors the activity in the phone and controls the LCD display I in response thereto.

Therefore, it is the controller 18, which detects the occurrence of a state change event and changes the state of the phone and thus the display text. The user may cause a state change event, when he activates the keyboard 7 including the navigation key 10, FIG. 1 and these type of events are called entry events or user events. However, the network communicating with the phone may also cause a state change event. These type of events and other events beyond the user's control are called non-user events. Non user events comprise status change during call set-up, change in battery voltage, change in antenna conditions, message on reception of SMS, etc.

Figure 4:
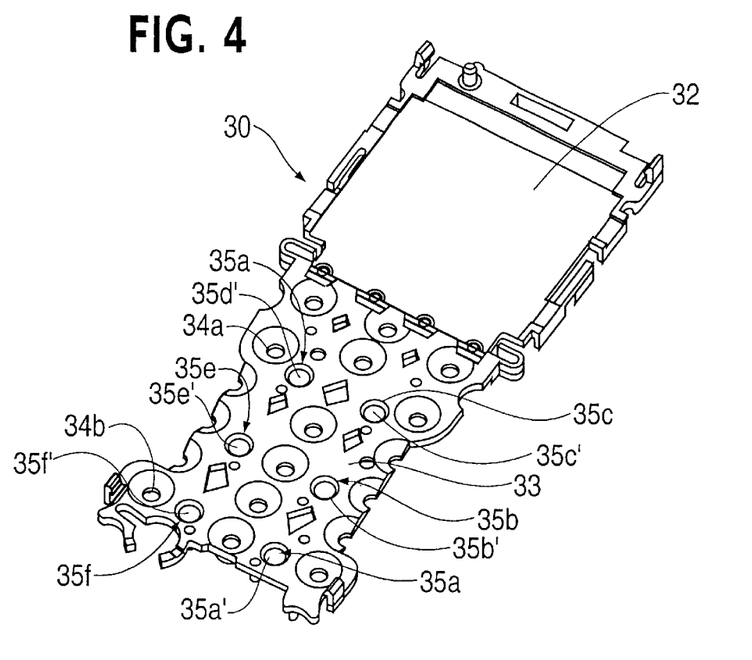
FIGS. 4–5 shows in a perspective view a light guide.
Figure 5:
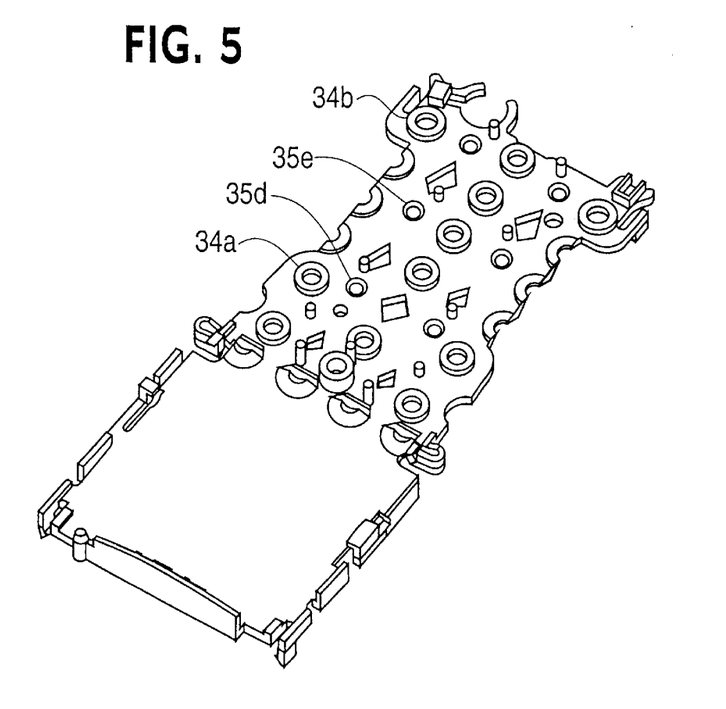
Figure 15:
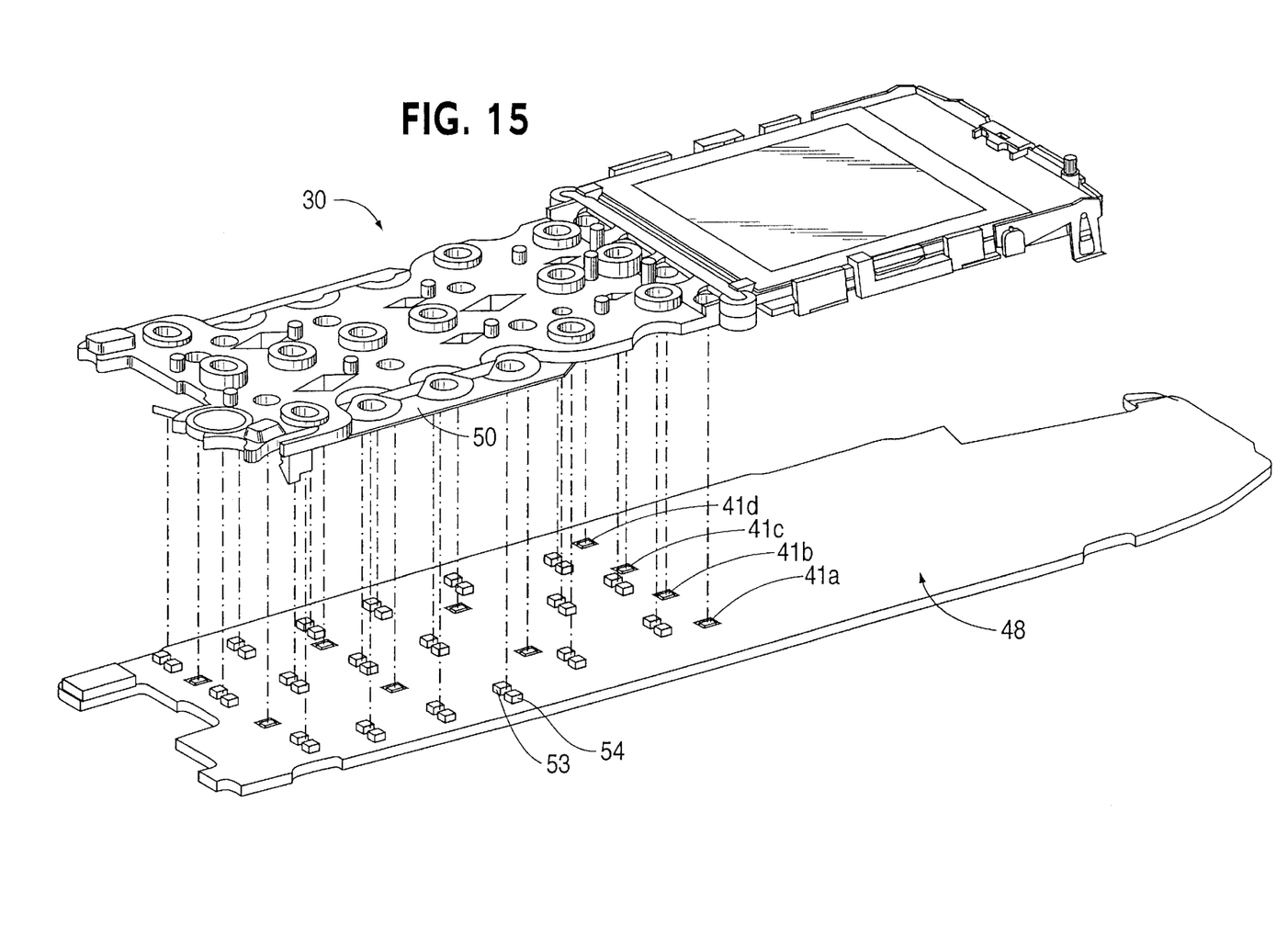
FIG. 15 is a perspective view of a light guide and plastic dome sheet positioned above a PCB having LED's and electrical contacts shown schematically thereon.

Reference is now made to FIG. 4 which is a perspective view of the back side of a light guide 30 that embodies the invention. The light guide 30 provides illumination for the LCD display 1 or the keyboard 7 shown in FIG. 1. The light guide 30 is a substantially transparent plate-formed element. The transparent plate-formed element has reception means 35a, 35b, 35c, 35d, 35e and 35f that receive light from respective light sources (not shown) and to guide the light into the transparent plate-formed element of the light guide 30. The light sources may be LED's which are shown in FIG. 15. The transparent plate formed element is comprised of a first part 32 of the light guide which constitutes being a back screen for a display and a second part 33 being a keyboard part. The light guide 30 could be made of a plastic material or other substantially transparent materials. The keyboard part includes a plurality of keyholes two of which 34a, 34b are referenced and reception means 35a through 35f. Each of the reception means 35 includes a plurality of light in-coupling surfaces 35a', 35b'c 35c', 35d', 35e', 35f', which face towards respective light sources (see FIG. 15). The light in-coupling surfaces 35a' through 35f' are substantially parallel with a main surface of the light guide 30 and transfers the light from the light sources located under each light in-coupling surface 35a'–35f' into the light guide 30. The light in-coupling surfaces 35a–35f have means for dispersing the light substantially perpendicular to the direction of the light source to illuminate the display 1. The means for dispersing the light from the light source into the light guide 30 are lenses 37, 37' and diffusers 38, 38' (see FIG. 7). The lenses 37, 37' are preferably concave and the light source (not shown) could be an LED that would be located to the left of the lenses 37, 37'.

Figure 7:
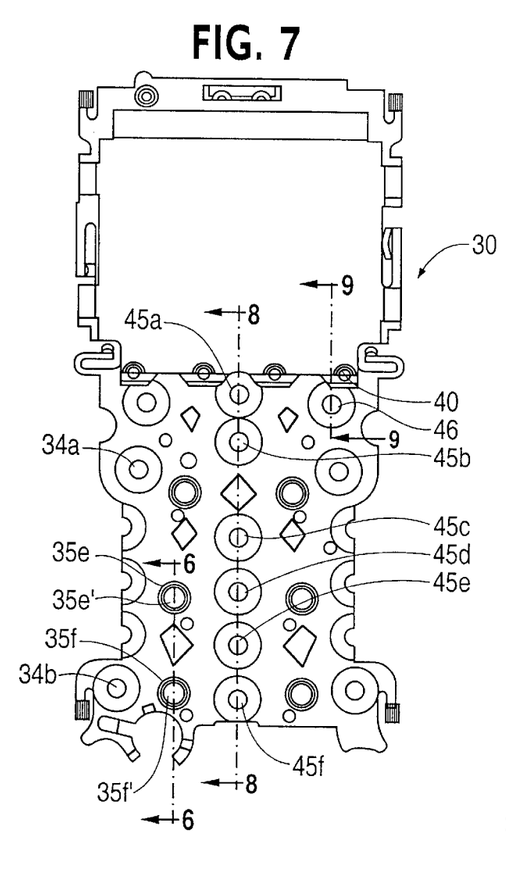
FIG. 7 shows cross section A A of the light guide of FIG. 6.

In FIG. 7 is shown that the lenses 37, 37' and the diffusers 38, 38' are together almost not as thick as the light guide 30.

A plane containing a line tangent of the central part of the lenses 37, 37' is parallel with the surface 31 of the light guide 30, which is closest to the light source (not shown). This means that the thickness of the light guide 30 does not have to be thicker than the diffuser/lens, which enables having a thinner light guide, 30 and less material. This light guide 30 is also more efficient since the lenses 37, 37' and the diffusers 38, 38' transfer a very large portion of the light from the light source to the light guide 30. The diffuser provides for the diffusion of light by the distribution of incident rays of light by reflection on the inner surfaces of the light guide. The reflected rays are reflected in a multiplicity of directions. In earlier known light guides, like the one shown in U.S. Pat. No. 5,746,493, the light is transferred directly from the LED into the light guide, giving a larger energy loss. In this document LEDs are also used, which extends through the whole light guide increasing the possible lost of energy.

Figure 6:
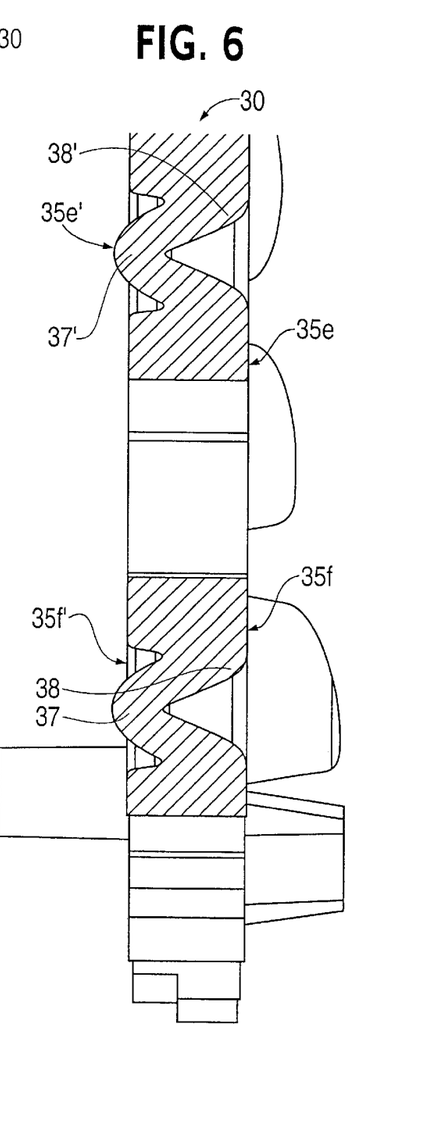
FIG. 6 shows a front view of the light guide, where several cross-sections has been indicated.
Figures 8, 9:
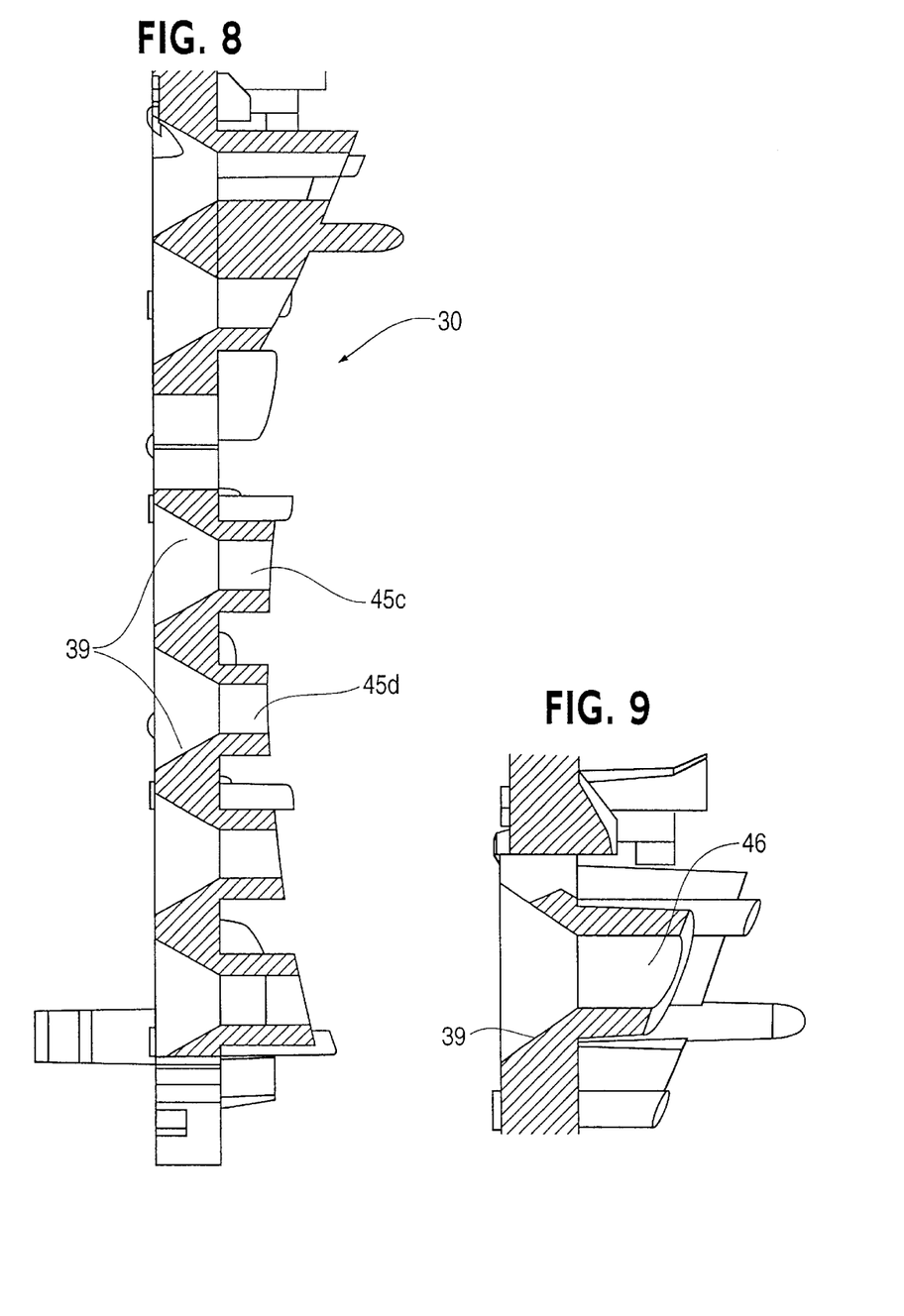
FIG. 8 shows cross section B B of the light guide of FIG. 6.
FIG. 9 shows cross section C C of the light guide of FIG. 6.

Attention is now directed to FIGS. 8 and 9 which depict sections of the light guide 30 that reveal the cross-section of key holes 45a, 45b, 45c, 45d, 45e and 45f. See FIG. 6, FIG. 8 and FIG. 9. The light guide 30 in the preferred embodiment is used to illuminate the keyboard 7. The light transferred from the diffuser travels substantially parallel to the surfaces of the light guide 30 and is reflected at the keyholes such as keyhole 46 by a chamfered surface 39 in the keyhole 46 (FIG. 9) and keyholes 45c, 45d, FIG. 8. The chamfered surface 39 reflects the light in the light guide 30 perpendicular to the surface of the light guide 30 onto the keyboard 7.

Figure 10:
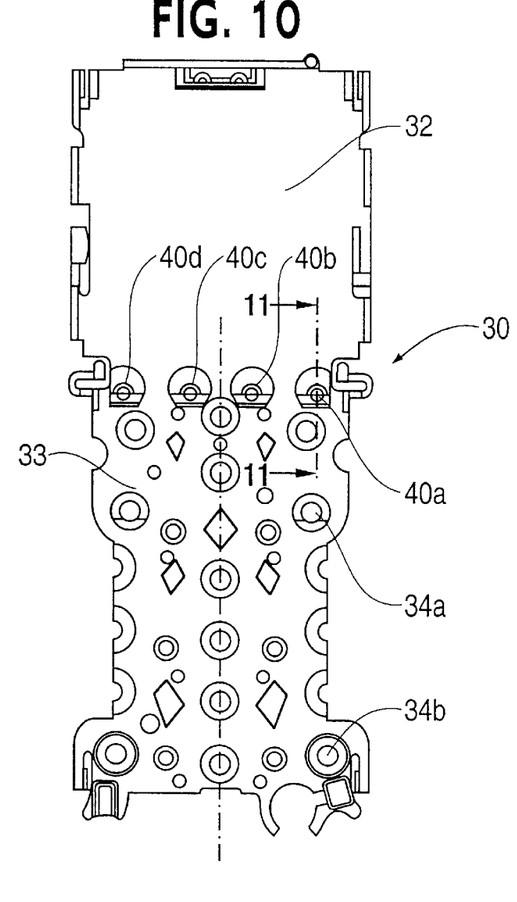
FIG. 10 shows a front view of the light guide, where cross section D D has been indicated.

Attention is now directed to FIG. 10 which illustrates a front view of the light guide 30 with its first part 32 and second part 33 having disposed therebetween a row of light in-coupling surfaces 40a, 40b, 40d, 40d.

Figure 11:
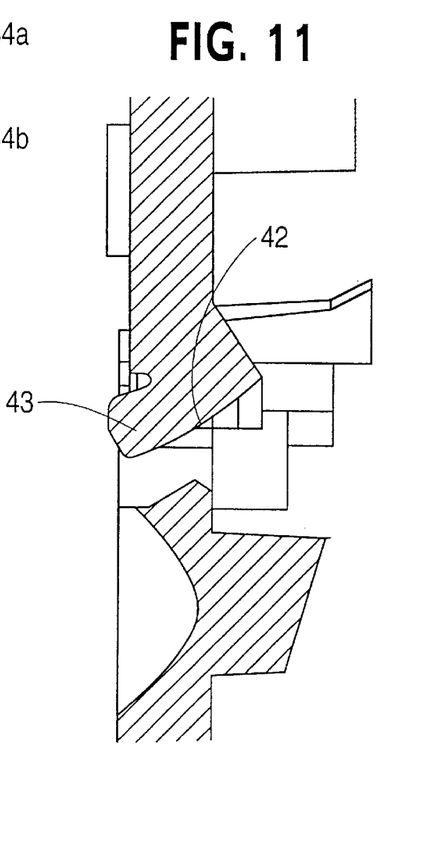
FIG. 11 shows cross section D D of the light guide of FIG. 10.

Each of the light in-coupling surfaces 40a, through 40d closest to the first part 32 which is a back screen for a display I has means to ensure that a maximum of the light from the light sources, e.g. LED 41a, 41b, 41c, 41d (FIG. 15), is transferred into the first part 32 of the light guide 30. The light sources just noted are located under said light in-coupling surfaces 40a, 40b, 40c, 40d, mounted on a printed circuit board 48. In FIG. 11 the means to ensure that a maximum of light from the LED's, just noted, are transferred into the first part 32 of the light guide 30 include a lens 43 and a diffuser 42 that stretches from the lens 43 to the light guide 30.

The light guide 30 comprises a front side as seen in FIG. 10 turning towards the keyboard 7 of FIG. 1 and the display I and a back side turning towards a printed circuit board 48, FIG. 15.

Figure 12:
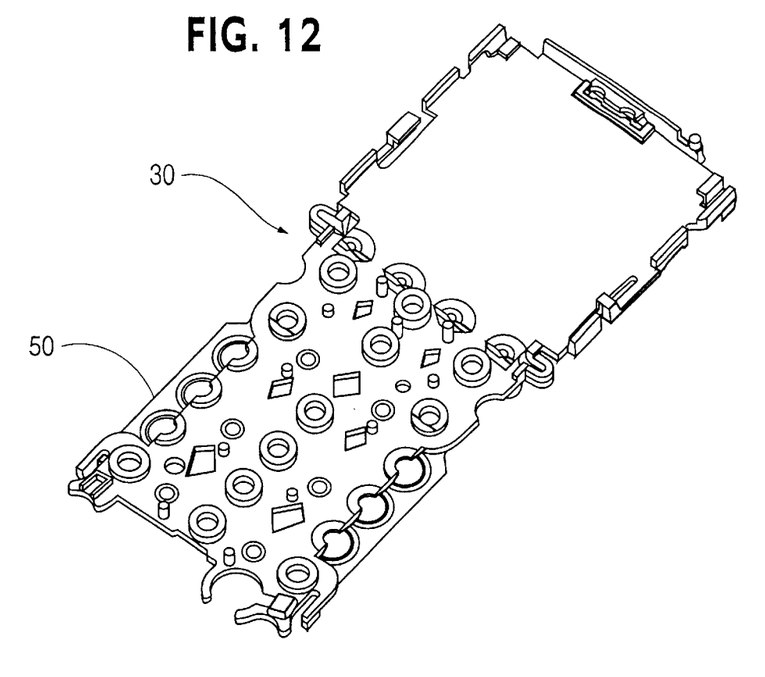
FIG. 12 shows in a perspective view the front side of the light guide with a plastic dome sheet applied to the backside.
Figure 13:
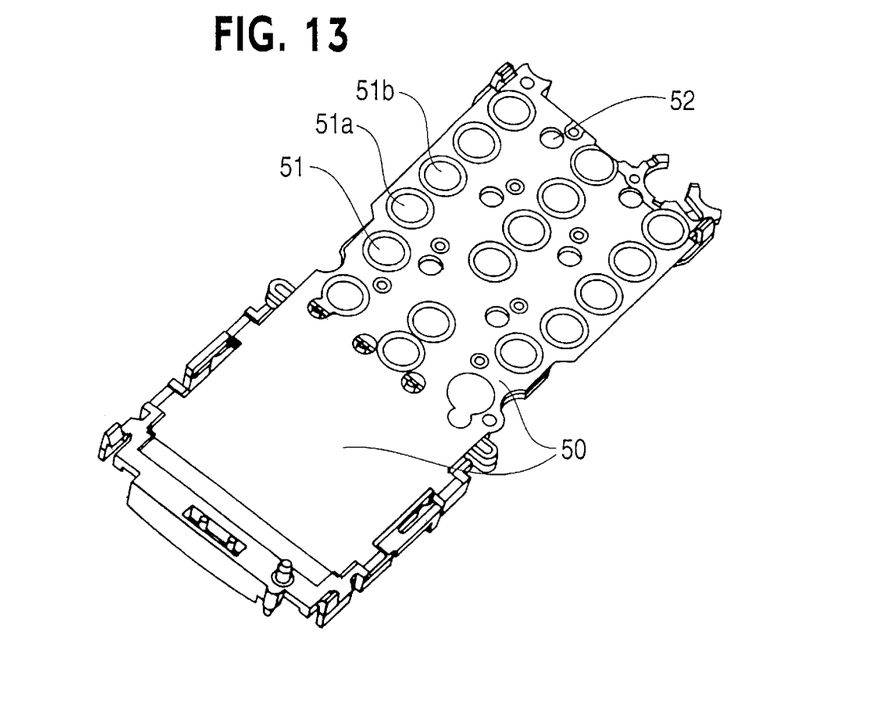
FIG. 13 shows in a perspective view the back side of the light guide with a plastic dome sheet applied thereto.
Figure 14:
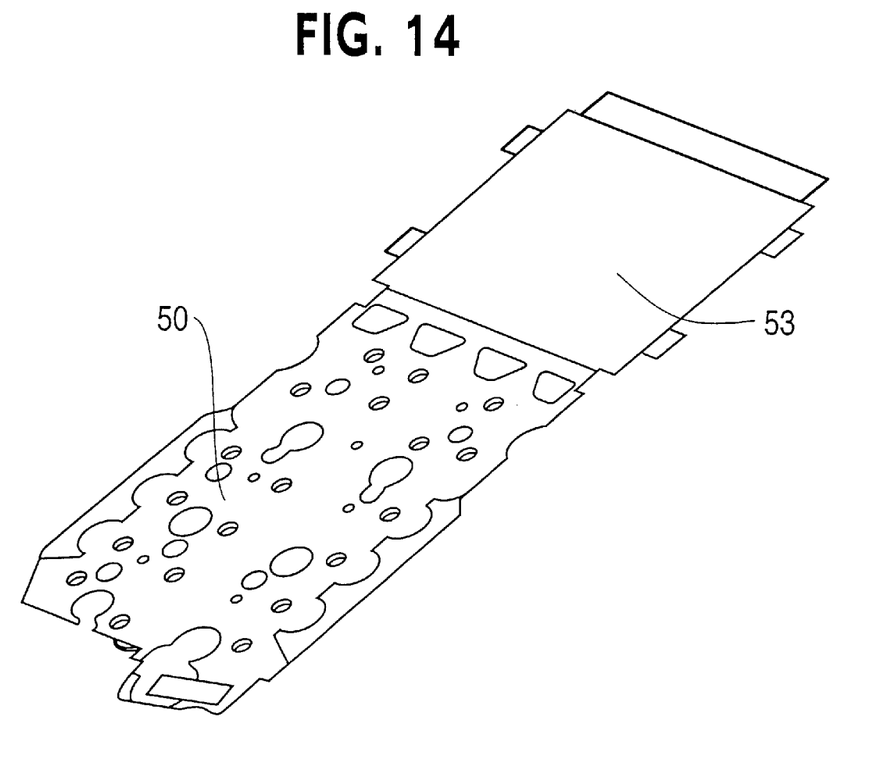
FIG. 14 shows in a perspective view the plastic dome sheet with a reflector sheet applied thereto.
Figure 16:
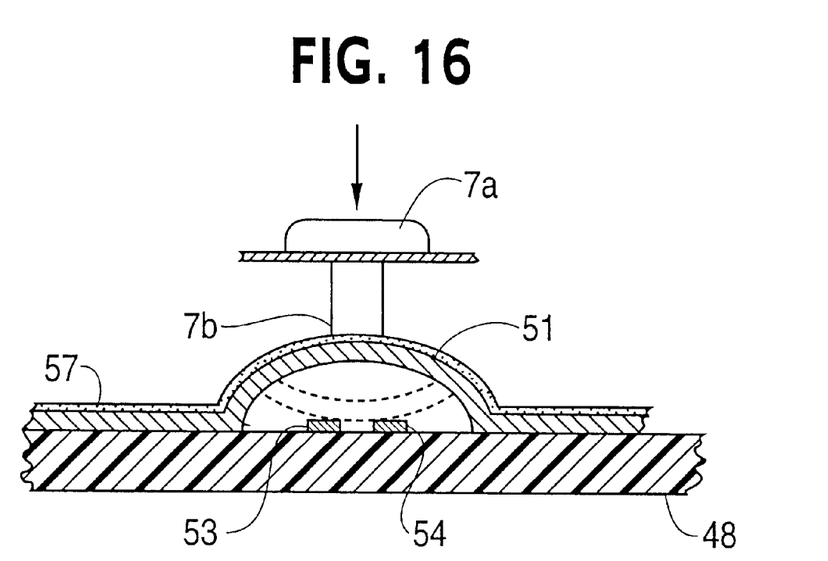
FIG. 16 is a cross-section of a typical keypad contact arrangement on a PCB.

In FIG. 12 and 13 is a light guide 30 shown having a plastic dome sheet 50 attached on to the back side of the light guide 30. The plastic dome sheet 50 is provided with metal domes 51, 51a, 51b on the side not attached to the light guide, which are affected by pressing the keys 8 of the keypad 7, to close circuit contacts 53, 54a circuit/switch, corresponding to each key 8, on printed circuit board 48. In FIG. 15 circuit contacts of the nature of 53, 54 are located on the PCB beneath each of the keys on the keypad 7, FIG. 1. FIG. 16 shows a cross-section of PCB 48 with circuit contacts 53, 54, plastic dome sheet 50, metal dome 51 and a key portion 7a that includes key portion extension 7b which extends through one of the keyholes in the light guide 30. The key portion extension 7b is secured to the metal dome 51 of the dome sheet 50 by way of the adhesive 52. All keypad keys are secured in the same manner to the dome sheet. A downward force keypad portion 7a will cause the metal domes 51 to flex as shown in dotted outline and complete a circuit across the contacts 53, 54. The dome sheet 50 is also provided with a plurality of holes 52 through which the light reaches the light in-coupling surfaces 35a–35f on the light guide, otherwise the light from the light sources would not pass through the plastic dome sheet 50. The part of the plastic dome sheet 50 that covers the first part 32, being the back screen for the display 1, includes a reflector sheet 53 as best seen in FIG. 14 for improving the illumination of the display.

The plastic dome sheet 50 is glued onto the light guide 30 with an adhesive 52 best seen if FIG. 16. This adhesive is also applied to the plastic dome sheet 50 surfaces that covers the keyholes 34 to flexibly attach the keyboard 7 via keypad 7a and keypad extension to the light guide 30. The keyboard 7 is therefore, when the phone is disassembled, attached to the light guide 30 and there are fewer loose parts. The keyboard 7 is also easily replaced if necessary.

FIG. 15 is a perspective view of the light guide 30 with plastic dome sheet 50 in place and positioned above PCB 48 to which it will be secured. In view of the foregoing description it will be evident to a person skilled in the art that various modifications may be made within the scope of the invention.

What is claimed is:

1. A light guide for illuminating a display or a keyboard including a substantially transparent plate-formed element with reception means for receiving light from light sources and guiding the light into the transparent plate-formed element of the light guide, the reception means includes light in-coupling surfaces each facing towards a light source, the light in-coupling surfaces are substantially parallel with a main surface of the light guide, and means are provided for dispersing the light substantially parallel with the main surface of the light guide.

2. A light guide according to claim 1, wherein the light guide includes:
   a first part supporting the display, and
   a second part supporting the keyboard, and said second part has a plurality of keyholes though which key taps extend for communicating with electrical contacts on a printed circuit board against which the light guide rests.

3. A light guide according to claim 2 wherein the means for dispersing the light from the light source in the light guide is a lens and a diffuser.

4. A light guide according to claim 3 wherein the keyboard is illuminated by the light guide, the light guide is provided with by the keyholes that have chamfered surfaces for reflecting the light in the light guide perpendicular to a lower surface of the light guide onto the keyboard.

5. A light guide according to claim 4 wherein the light source located under each in-coupling surface is an LED mounted on a printed circuit board.

6. A light guide according to claim 3 wherein the in-coupling surface on the second part, closest to the first part has means to ensure that a maximum of the light from LEDs located under said in-coupling surface is transferred into the first part of the light guide which is a back screen for a display.

7. A light guide according to claim 6 wherein the means, to ensure that a maximum of the light from the LED located under the light in-coupling surface on the second part, closest to the first part, is a diffuser that stretches to one end of the lens to transfer the light from the lens to through the diffuser such that most of the light from the LED that enters the lens is transferred into the first part.

8. A light guide according to claim 1 wherein a plastic dome sheet is attached on a back side of the light guide, said plastic dome sheet is provided with holes juxtaposed light in-coupling surfaces that have a lens and a diffuser for dispersing the light substantially parallel with the main surface of the light guide, and means coupled to the lens and diffuser for dispersing the light substantially parallel with the main surface of the light guide, and keyholes in the light guide have chamfered surfaces for reflecting the light in the light guide perpendicular to the back side of the light guide, said plastic dome sheet is provided with a reflector sheet positioned on the plastic dome sheet adjacent the display.

9. A light guide for illuminating a display or a keyboard, including a substantially transparent plate-formed element with reception means for receiving light from light sources and guiding the light into the transparent plate-formed element of the light guide; a plastic dome sheet is mounted on a back side of the light guide, said plastic dome sheet is provided with holes juxtaposed the reception means which has light in-coupling surfaces facing towards the light sources and substantially parallel with the main surface of the light guide, the reception means including means for dispersing the light substantially parallel with the main surface of the light guide; said plastic dome sheet is provided with a reflector sheet positioned on the plastic dome sheet adjacent the display.

10. A light guide according to claim 9 wherein domes mounted on the plastic dome sheet are made of metal; a printed circuit board includes pairs of circuit contacts arranged on the printed circuit board beneath the domes, the pairs of circuit contacts will be short-circuited, when a keypad and related key tap are pressed and cause the metal dome to deflect into electrical contact with the pairs of the circuit contacts thereby completing a circuit.

11. A light guide according to claim 10 wherein the plastic dome sheet is provided with means to flexibly attach the keyboard to plastic dome sheet.

12. A light guide according to claim 11 wherein the means to flexibly attach the keyboard to light guide is an adhesive that holds each key and keytap of the keyboard onto a metal dome on the plastic dome sheet.

13. A communication unit provided with a light guide for illuminating a display or a keyboard, including a substantially transparent plate-formed element with multiple reception means each receiving light from separate light sources, the reception means guiding the light into the transparent plateformed element of the light guide, the reception means includes light in-coupling surfaces facing towards respective light sources, the in-coupling surfaces are substantially parallel with the main surface of the light guide, the reception means further includes means for dispersing the light substantially parallel with a main surface of the light guide.

14. A communication unit provided with a light guide according to claim 13, wherein the light guide includes:
   a first part supporting the display, and
   a second part supporting the keyboard, and said second part has a plurality of keyholes though which key taps of keypads extend for communicating with electrical contacts on a printed circuit board against which the light guide rests.

15. A communication unit including a light guide according to claim 14 wherein the means for dispersing the light from the light source into the light guide is a lens and a diffuser.

16. A communication unit including a light guide according to claim 15 wherein the keyboard is illuminated by the light guide, the light guide having keyholes that have chamfered surfaces for reflecting the light in the light guide perpendicular to a back surface of the light guide.

17. A communication unit provided with a light guide for illuminating a display or a keyboard, including a substantially transparent plate-formed element that includes multiple reception means for receiving light from separate light sources and for guiding the light into the transparent plate-formed element of the light guide, the light guide further includes keyhole openings through the light guide and a plastic dome sheet mounted on a back side of the light guide, said plastic dome sheet is provided with holes through, which the corresponding reception means having light in-coupling surfaces and means for dispersing the light substantially parallel with a main surface of the light guide, the keyholes have means for reflecting the light in the light guide perpendicular to a lower surface of the light guide, said plastic dome sheet is provided with a reflector sheet positioned on the plastic dome sheet adjacent the display.

18. A communication unit including a light guide according to claim 17 wherein the domes mounted on the plastic dome sheet are made of metal and cooperate with pairs of metal contacts on a printed circuit board secured to the plastic dome sheet and the light guide, a keyboard provided with keys is adapted to cooperate with the metal domes when the keys are pressed and thereby cause the metal domes to flex and complete a circuit across the metal contacts of the printed circuit board.

19. A communication unit including a light guide according to claim 18 wherein the plastic dome sheet is provided with means to flexibly attach the keyboard to plastic dome sheet, and these means are an adhesive that holds each key of the keyboard onto the plastic dome sheet.

* * * * *